3,452,089
PRODUCTION OF ALPHA,ALPHA-DIHALO-
ALIPHATIC ACIDS
Samuel Wendell Long, Breckenridge, Mich., assignor to
Michigan Chemical Corporation, St. Louis, Mich., a
corporation of Michigan
No Drawing. Filed June 9, 1966, Ser. No. 556,254
Int. Cl. C07c 53/16, 53/32
U.S. Cl. 260—539      7 Claims

ABSTRACT OF THE DISCLOSURE

In the chlorination or bromination of the alpha-carbon atom of organic acids in the presence of a sulfur-containing halogenation catalyst to produce alpha,alpha-dihalo organic acids, better yields and higher efficiencies are obtained by carrying out the process in the presence of a catalytic amount of a nitro aromatic compound.

---

This invention concerns generally an improvement in the process for the production of alpha,alpha-dihalo organic acids. More specifically this invention concerns an improved procedure and catalysts for the production of alpha,alpha-dihalo aliphatic acids having the general formula $$RCX_2CO_2H$$

wherein R is a lower alkyl radical of one to eight carbon atoms and X is chlorine or bromine.

The classical method for the production of alpha-halo aliphatic acids known as the Hell-Volhard-Zelinsky procedure, comprises the addition of the halogen to the aliphatic acid containing a catalytic amount of a phosphorus-containing halogenation catalyst such as phosphorus trichloride or phosphorus oxychloride (Fieser and Fieser, Organic Chemistry, 3rd ed., N.Y. Reinhold, 1956, p. 170). These authors state that the reaction proceeds stepwise to produce first the alpha-halo acid and then the alpha,alpha-dihalo acid and that the more remote positions in the carbon chain are not attacked.

Bass, in U.S. Patent No. 2,010,685, has described a procedure and catalysts for chlorinating aliphatic acids to form alpha-monochloro aliphatic acids. The chlorination was carried out at temperatures of from 50° to 140° C. in the presence of halogenation catalysts such as the halides, oxyhalides, oxygen acids and oxides of the elements phosphorus, arsenic, antimony, sulfur, selenium, and tellurium; the halides of the elements tin, iron, and aluminum; and the halo-oxygen acids of the elements phorphorus and sulfur.

Brust and Senkbeil, in U.S. Patent No. 2,809,992, have described an improved process for making alpha,alpha-dihalopropionic acids by reacting the halogen with the alpha-halopropionic acid at elevated temperatures in the presence of a phosphrous-containing halogenation catalyst. These inventors found that, whereas the monochlorination of propionic acid under the conditions described by Bass resulted in substantially pure alpha-chloropropionic acid containing little or no trichloro derivative and only a small amount of the alpha,alpha-dichloro derivative, the further chlorination of the alpha-chloropropionic acid under the conditions described by Bass proceeded only slowly and resulted in the formation of substantial amounts of other polychloro derivatives such as alpha, beta-dichloropropionic acid and alpha,alpha,beta-trichloropropionic acid. Thus, contrary to the aforementioned broad statement by Fieser and Fieser, under the conditions described by Bass the addition of a second chlorine atom to alpha-chloropropionic acid results in attack by chlorine on the remote carbon atom as well as on the alpha-carbon atom. Brust and Senkbeil found that chlorination of alpha-chloropropionic acid at temperatures of from 150° to 225° C. in the presence of a phosphorus-containing halogenation catalyst proceeded more rapidly than under the conditions described by Bass and with the production of lesser amounts of products having a chlorine atom attached to the more remote carbon atom.

Even when the chlorination of alpha-monochloropropionic acid is carried out under the conditions described in U.S. Patent No. 2,809,992, the extent of chlorination is difficult to control. It is apparent that if the addition of chlorine is continued until all of the alpha-monochloropropionic acid is further chlorinated in the alpha position, there is still produced a substantial quantity of the higher boiling, more highly chlorinated derivatives. If the addition of chlorine is ended before significant amounts of the more highly chlorinated derivatives are produced, a significant amount of unreacted alpha-monochloropropionic acid remains. Because of the closeness of the boiling points of the two acids, the monochloro derivative can be removed only with difficulty from the desired dichloro derivative.

The production of more highly halogenated derivatives along with the dihalo derivative is not surprising. As the halogenation of the monohalo derivative approaches completion, the concentration of the dihalo derivative increases and the concentration of the monohalo derivative decreases. Even though the specific rate of halogenation at a more remote carbon might be considerably less than that of halogenation at the alpha-carbon, as these changes of concentration take place the actual rate of halogenation at more remote carbon atoms becomes significant in relation to the actual rate of halogenation of the alpha-carbon atom. The production of more highly halogenated products would be expected as the halogenation to produce the alpha,alpha-dihalo derivative approaches completion.

Higher molecular weight homologs of propionic acid, as for example, butyric acid and pentanoic acid, etc., have a greater number of hydrogen atoms attached to more remote carbon atoms than does propionic acid. These hydrogen atoms are subject to replacement by halogen atoms as are the beta-hydrogens of propionic acid. Thus, it is expected that in the halogenation of acids having more hydrogen atoms than does propionic acid there would be produced a greater proportion of more remotely halogenated derivatives during the attempted production of the alpha,alpha-dihalo derivatives than occurs during the production of alpha,alpha-dihalo propionic acid.

Many of the halogenation catalysts commonly used in the preparation of alpha-halo and alpha,alpha-dihalo aliphatic acids have relatively high vapor pressures and relatively low boiling points and are highly toxic. This is true of phosphorus trichloride, phosphorus pentachloride, and phosphorus oxychloride mentioned by Fieser and Fieser in the reference identified hereinbefore and in U.S. 2,809,992. Because of these properties, two disadvantages are associated with the use of these materials under the conditions employed for the reaction. The materials are very hazardous and the materials are lost from the reaction mixture and must be either employed in large amounts initially or must be replenished frequently during the course of the reaction.

It is an object of this invention to provide an improvement in the process for the halogenation of lower aliphatic acids to produce the alpha,alpha-dihalo acids in higher yields and contaminated by lesser amounts of other derivatives than is possible by processes heretofore known.

It is another object of this invention to provide catalysts for the production of alpha,alpha-dihalo aliphatic acids which have relatively low vapor pressures and relatively high boiling points so as to reduce the toxicity hazard and minimize the quantity of the halogenation catalyst which must be employed.

Other objects of the invention will become apparent from the following specification.

According to this invention alpha,alpha-dihalo organic acids, having the general formula

where R is a lower aliphatic radical of one to eight carbon atoms and X is chlorine or bromine, are prepared by the reaction of a halogen, such as chlorine or bromine, with an organic acid, having the general formula

wherein Y is hydrogen, chlorine or bromine, at elevated temperatures in the presence of a sulfur-containing halogenation catalyst and a catalytic amount of a nitro aromatic compound.

Included within the group of sulfur-containing halogenation catalysts are sulfur and its halides, oxyhalides, oxides, oxygen acids, and halo-oxygen acids. More specifically, sulfur-containing halogenation catalysts which can be used in carrying out this invention are, for example, fuming sulfuric acid (oleum), chlorosulfonic acid, and sulfur monochloride.

The sulfur-containing halogenation catalyst is employed in an amount of from about 0.3 percent to about 15 percent, but preferably in an amount of from 0.5 percent to 8 percent, based upon the weight of the organic acid being halogenated.

The nitro aromatic compound used in catalytic amounts can be any compound wherein one or more nitro groups are attached directly to an aromatic nucleus. Those with a nitrobenzene ring system are preferred. For example, catalytic amounts of the following nitro aromatic compounds are used in carrying out this invention: nitrobenzene, m-dinitrobenzene, p-nitrotoluene, o-nitrobenzoic acid, p-nitrobenzoic acid, m-nitrobenzoyl chloride, 3,5-dinitrobenzoyl chloride, 3-nitrophthalic anhydride, 4-nitrophthalimide, 3,5-dinitrosalicylic acid, m-nitroacetophenone, p-nitroaniline, p-nitroacetanilide, 2-amino-4-nitrophenol, 2,4-dinitrophenylhydrazine, 4,6-dinitro-o-cresol, picric acid, and 5-nitro-o-toluenesulfonic acid. p-Nitrobenzoic acid is preferred.

The nitro compound is employed in an amount of from about 0.3 percent to about 15 percent, preferably from 0.5 percent to 8 percent, based upon the weight of the acid being halogenated.

The halogenation reaction can be carried out in two steps or in one step. In the first step of the two-step procedure the alpha-monohalo derivative can be prepared in the usual manner of the prior art. In the second step, the nitro aromatic compound catalyst is added to the alpha-monohalo derivative along with the halogenation catalyst and then the mixture is further halogenated. As a one-step procedure, both catalysts can be added to the organic acid and sufficient halogen added to convert the acid to the alpha,alpha-dihalo derivative.

When the reaction is carried out as a one-step procedure, the temperature of the reaction mixture is raised gradually during and simultaneously with the addition of halogen from an initial temperature of about 100° C. to a final temperature of about 200° C., preferably from about 130° C. to about 180° C. When the two-step procedure is used the halogenation of the second step is carried out at temperatures of from 140° C. to 200° C., preferably from 150° C. to 180° C.

The halogentation reaction, whether done as a one-step or as a two-step procedure, can be done at ambient atmospheric pressure or can be done at higher pressures within a closed system. When pressures in excess of the ambient pressure are used, relatively higher reaction temperatures can be employed. The reaction can be carried out under pressures less than the ambient atmospheric pressure. However, because the use of such lower pressures results in more rapid elimination of unreacted halogen from the reaction mixture, use of such lower pressures is not preferred.

The reaction can be carried out in the presence of an inert solvent or in the absence of any solvent. Under the reaction conditions employed in carrying out this invention the reaction mixture is in the liquid state. The absence of solvent is preferred, thus maintaining high productivity per unit volume of reaction mixture and avoiding the necessity of purifying and recycling a solvent.

In carrying out this invention, the organic acid to be halogenated and the appropriate catalysts are placed in a suitable reaction vessel. The reaction vessel is preferably opaque so as to exclude light from the reaction mixture. The reaction mixture is stirred and heated to the reaction temperature within the ranges described hereinbefore. The halogen is introduced into and dispersed in the liquid reaction mixture at about the rate at which it is consumed in the reaction. The reaction of the halogen with the organic acid produces the halo derivative of the organic acid and hydrogen halide. The hydrogen halide gas is allowed to escape from the reaction mixture through a reflux condenser which serves to condense and return organic vapors to the reaction mixture.

During the addition of the halogen, the temperature of the reaction mixture is maintained in the range herein described, but not in substantial excess of the boiling point of the reaction mixture. As the halogenation proceeds and the concentrations of the mono and then the dihalo derivatives increase, the boiling point of the reaction mixture increases. As the temperature of the reaction mixture is increased gradually within the range described herein, the reaction is accelerated, but without significant entrainment and loss of organic materials in the escaping stream of hydrogen halide.

The introduction of halogen is stopped when analysis shows that the organic acid and its monohalo derivative have been substantially consumed.

After the halogenation has been completed, any insoluble catalyst residue can be separated from the reaction mixture by decantation or filtration. Enough water is added to hydrolyze any anhydrides and organic and inorganic acid halides and any water layer is separated from the organic product. The organic product can be dried and used, or the organic product can be purified further by distillation either at atmospheric pressure or at a reduced pressure.

The following examples of the preparation of alpha,alpha-dichloropropionic acid by the chlorination of propionic acid serve to illustrate the operation of this invention but are not meant to be considered as limiting its scope. The content of alpha,alpha-dichloropropionic acid in the crude product was determined by infrared analysis.

Comparative Examples I and II illustrate the results obtained when the chlorination of propionic acid to produce alpha,alpha-dichloropropionic acid is carried out in the presence of fuming sulfuric acid as the chlorination catalyst but in the absence of a catalytic amount of a nitro aromatic compound.

COMPARATIVE EXAMPLE I

Four moles, 296 grams, of propionic acid and 6 grams of fuming sulfuric acid (114%) were placed in a 500-ml. three-neck reaction flask equipped with a stirrer, a water-cooled condenser and a porous gas diffusion plug extending to below the surface of the liquid reaction mixture. The flask and lower portion of the condenser were covered with an opaque material in order to exclude light. The reaction mixture was stirred and heated to 112° C. at which temperature addition of chlorine was begun. As the chlorination progressed and the boiling point of the reaction mixture rose, the temperature of the reaction mixture was gradually raised to 145° C. Over a period of 32 hours 643 grams of chlorine was introduced. The product, 572 grams, was found by infrared analysis to contain 25 percent by weight of alpha,alpha-dichloropropionic acid. This corresponds to yields of 25.0 and 22.1 percent based on propionic acid and chlorine, respectively.

COMPARATIVE EXAMPLE II

In the manner substantially identical to that described in Comparative Example I, a mixture of 296 grams of propionic acid and 12 grams of fuming sulfuric acid (114%) was chlorinated, the initial temperature being 130° C. Over a period of 20 hours, 427 grams of chlorine was added while the temperature of the reaction mixture be drastically reduced to as low as 25 hours without a serious reduction in the yield of alpha,alpha-dichloropropionic acid. That the presence of a catalytic amount of p-nitrobenzoic acid prevents or at least greatly lessens the attack by chlorine on the more remote, beta carbon atom, thereby inhibiting the formation of alpha,alpha, beta-trichloropropionic acid, is shown by Example V. Although 37.5% excess of chlorine was added to the reaction mixture, the content of alpha,alpha-dichloropropionic acid in the reaction product was 82.5 weight percent. Had the addition of such a large excess of chlorine resulted in the further chlorination of alpha,alpha-dichloro-

TABLE I.—CHLORINATION OF FOUR MOLES (296 GRAMS) OF PROPIONIC ACID

| Example No. | Catalysts | Temperature range (° C.) | Time (hours) | Chlorine added (grams) | Weight of Product (grams) | $\alpha,\alpha$-Dichloropropionic acid in reaction product (weight percent) | Percent yield Based on propionic acid | Percent yield Based on chlorine |
|---|---|---|---|---|---|---|---|---|
| I | 6 g. oleum | 112-145 | 32 | 643 | 572 | 25.0 | 25.0 | 22.1 |
| II | 12 g. oleum | 130-167 | 20 | 427 | 390 | 5.0 | | |
| III | 6 g. oleum, 6 g. 3,5-dinitrobenzoyl chloride | 135-175 | 33 | 640 | 493 | 78.0 | 68.1 | 60.5 |
| IV | 6 g. oleum, 6 g. p-nitrobenzoic acid | 139-174 | 75 | 710 | 499 | 79.0 | 69.0 | 55.2 |
| V | do | 140-171 | 55 | 781 | 510 | 82.5 | 73.5 | 53.5 |
| VI | do | 139-174 | 25 | 710 | 518 | 75.0 | 68.0 | 54.4 |
| VII | 6 g. oleum, 6 g. 3,5-dinitrosalicylic acid | 138-175 | 48 | 710 | 532 | 81.5 | 75.8 | 60.6 |
| VIII | 6 g. oleum, 6 g. m-nitrobenzoyl chloride | 136-174 | 38 | 640 | 498 | 77.5 | 67.5 | 60.0 |
| IX | 6 g. oleum, 6 g. 4-nitrophthalimide | 135-170 | 44 | 711 | 524 | 79.0 | 72.4 | 57.9 |
| X | 6 g. oleum, 6 g. 3-nitrophthalic anhydride | 138-175 | 58 | 710 | 500 | 72.5 | 66.5 | 53.2 |
| XI | 6 g. oleum, 6 g. 4,6-dinitro-o-cresol | 138-173 | 57 | 710 | 518 | 81.0 | 73.4 | 58.7 |
| XII | 6 g. oleum, 6 g. picric acid | 136-176 | 57 | 710 | 527 | 77.5 | 71.5 | 57.2 |
| XIII | 6 g. oleum, 6 g. 2-amino-4-nitrophenol | 135-175 | 81 | 852 | 515 | 76.0 | 68.5 | 45.6 |
| XIV | 6 g. oleum, 6 g. 2,4-dinitrophenylhydrazine | 137-170 | 37 | 711 | 515 | 67.0 | 60.4 | 48.3 |
| XV | 12 g. oleum, 12 g. nitrobenzene | 135-174 | 55 | 712 | 525 | 77.5 | 71.1 | 56.9 |
| XVI | 12 g. oleum, 6 g. nitrobenzene | 130-175 | 43 | 639 | 508 | 77.5 | 68.8 | 61.2 |
| XVII | 12 g. oleum, 2 g. nitrobenzene | 140-175 | 39 | 640 | 463 | 58.0 | 47.0 | 41.7 |
| XVIII | 1 g. oleum, 6 g. nitrobenzene | 136-175 | 68 | 710 | 504 | 75.0 | 66.1 | 52.9 |
| XIX | 12 g. oleum, 6 g. p-nitrobenzoic acid | 135-175 | 59 | 710 | 509 | 75.5 | 67.2 | 53.7 |
| XX | 2 g. oleum, 6 g. p-nitrobenzoic acid | 140-170 | 43 | 639 | 503 | 74.0 | 65.1 | 57.9 |
| XXI | 12 g. oleum, 6 g. o-nitrobenzoic acid | 140-174 | 39 | 710 | 493 | 72.5 | 62.5 | 50.0 |
| XXII | 12 g. oleum, 6 g. p-nitrotoluene | 136-173 | 40 | 639 | 507 | 75.0 | 66.5 | 59.1 |
| XXIII | 12 g. oleum, 6 g. m-nitroacetophenone | 138-175 | 50 | 710 | 500 | 70.0 | 61.2 | 49.0 |
| XXIV | 12 g. oleum, 6 g. p-nitroaniline | 136-175 | 64 | 711 | 513 | 75.0 | 67.2 | 53.8 |
| XXV | 12 g. oleum, 6 g. phthalic anhydride | 138-173 | 37 | 514 | (¹) | | | |

¹ Decomposed.

was raised gradually to 167° C. The product, 390 grams, was black in color and was found, by infrared analysis, to contain less than 5 weight percent of alpha,alpha-dichloropropionic acid. Because it was apparent that excessive decomposition was occurring in the reaction mixture, the chlorination was discontinued.

Examples III-XXIV illustrate the effect of the presence of catalytic amounts of nitro aromatic compounds along with varying catalytic amounts of fuming sulfuric acid.

EXAMPLE III

In a manner substantially identical to that described in preceding examples, 296 grams of propionic acid containing 6 grams of fuming sulfuric acid and 6 grams of 3,5-dinitrobenzoyl chloride was chlorinated over a period of 33 hours with 640 grams of chlorine in the temperature range of 135°-175° C. The product, 493 grams, was found to contain 79.0 percent by weight of alpha,alpha-dichloropropionic acid. This corresponds to yields of 68.1 and 60.5 percent based on propionic acid and chlorine, respectively.

Table I summarizes the reaction conditions and results for Comparative Examples I and II and Examples III-XXIV, all of which were carried out in a substantially identical manner but with varying quantities of fuming sulfuric acid (114%) and varying quantities of various nitro aromatic compounds and with some variations of the time and quantity of chlorine added.

It can be seen from the results of Examples I-XXIV that the use of catalytic amounts of any of a large number of nitro aromatic compounds along with catalytic amounts of fuming sulfuric acid (114%) in the chlorination of propionic acid greatly improves the yield of alpha,alpha-dichloropropionic acid over that obtained when catalytic amounts of fuming sulfuric acid alone are used. Examples IV, V, and VI show that when 6 grams of p-nitrobenzoic acid is used along with 6 grams of fuming sulfuric acid (114%) the time for the chlorination can propionic acid by attack by chlorine on the beta carbon atom, the weight percent of alpha,alpha-dichloropropionic acid in the product mixture would have been much less. This is also shown by Example XIII wherein an even larger excess of chlorine was employed in the presence of a catalytic amount of 2-amino-4-nitrophenol. In Example XIII, the weight percent of the alpha,alpha-dichloropropionic acid in the product mixture was relatively high in spite of the use of a large excess of chlorine.

Examples XV, XVI and XVII show the effect of the use of varying quantities of nitrobenzene as a catalyst along with 12 grams of fuming sulfuric acid (114%). In Example XVII, wherein only 2 grams of nitrobenzene was used, the weight percent of alpha,alpha-dichloropropionic acid was 58.0, significantly lower than the 77.5% of Example XVI which was carried out under nearly identical conditions but with 6 grams of nitrobenzene. In Example XV, wherein 12 grams of nitrobenzene was used, a larger excess of chlorine was used than in Example XVI, resulting in a higher yield of product, based on propionic acid, but no reduction in the weight percent of alpha,alpha-dichloropropionic acid in the product mixture. Thus, experiments with nitrobenzene show the advantage of the use of a nitro aromatic compound.

Examples XVIII and XX also show an advantage of the use of catalytic amounts of a nitro aromatic compound along with the sulfur-containing chlorination catalyst. In Example XVIII only 1 gram of fuming sulfuric acid was used with 6 grams of nitrobenzene and in Example XX only 2 grams of fuming sulfuric acid was used with 6 grams of p-nitrobenzoic acid. In both instances the yields and weight percent of alpha,alpha-dichloropropionic acid in the product mixture were comparable to those obtained in other examples wherein larger catalytic amounts of fuming sulfuric acid were employed. Thus, when a catalytic amount of a nitro aromatic compound is present, lesser amounts of the sulfur-containing chlorination catalyst can be employed successfully.

Other examples summarized in Table I further illustrate the advantageous effect of the use of catalytic amounts of a large number of nitro aromatic compounds in this reaction.

Comparative Example XXV shows the effect of the use of a catalytic amount of an aromatic compound not bearing a nitro group.

COMPARATIVE EXAMPLE XXV

In a manner substantially identical to that described in previous examples, 296 grams of propionic acid containing 12 g. of fuming sulfuric acid (114%) and 6 g. of phthalic anhydride was chlorinated in the temperature range of 138°–173° C. Over a period of 37 hours 514 grams of chlorine was added. During the addition of chlorine the reaction mixture became black, showing evidence of gross decomposition. No significant amount of alpha,alpha-dichloropropionic acid was found in the product mixture.

The results of Comparative Example XXV, summarized in Table I, are similar to Comparative Example II wherein 12 grams of fuming sulfuric acid alone was used. Comparison of Comparative Example XXV with Example X, wherein a catalytic amount of 3-nitrophthalic anhydride was used, illustrates that the effect of the nitro aromatic compound is not due solely to the aromatic nucleus.

Table II summarizes the results of Examples XXVI–XXX wherein other catalysts and combinations of catalysts were used in the preparation of alpha,alpha-dichloropropionic acid. Comparisons of the results of these examples illustrate further the advantage of the use of a nitro aromatic compound along with the sulfur-containing chlorination catalyst.

at relatively high temperatures and must be replenished from time to time in order to keep the concentration of the catalyst at the necessary levels, as evidenced in U.S. 2,809,992. When, in accordance with this invention, a catalytic amount of a nitro-aromatic compound is present along with a sulfur-containing chlorination catalyst, chlorination catalysts having relatively lower vapor pressures and relatively high boiling points can be employed. With the method of this invention there is, therefore, less hazard due to toxic vapors and there is no need to replenish the catalyst from time to time during addition of the halogen.

Various modifications may be made in this invention without departing from the spirit or scope thereof, and it is to be understood that the invention is limited only as defined in the following claims.

I claim:

1. In the process for the production of an alpha,alpha-dihalo organic acid of the general formula:

$$RCX_2CO_2H$$

wherein R is a lower alkyl radical of one to eight carbon atoms and X is selected from the group consisting of chlorine and bromine, by the reaction at a temperature of at least 100° C. of a halogen selected from the group consisting of chlorine and bromine with an organic acid in the liquid phase of the general formula:

$$RCHCO_2H$$
$$\phantom{RC}|$$
$$\phantom{RCH}Y$$

wherein R is a lower alkyl radical of one to eight carbon atoms and Y is selected from the group consisting of

TABLE II.—CHLORINATION OF FOUR MOLES (296 GRAMS) OF PROPIONIC ACID

| | | | | | α,α-Dichloropropionic acid in | Percent yield | |
|---|---|---|---|---|---|---|---|
| Example No. | Catalysts | Temperature range (° C.) | Time (hours) | Chlorine added (grams) | Weight of Product (grams) | reaction product (weight percent) | Based on propionic acid | Based on chlorine |
| XXVI | 6 g. chlorosulfonic acid | 137–170 | 49 | 639 | 482 | 64.0 | 54.0 | 48.0 |
| XXVII | 6 g. chlorosulfonic acid, 10 g. nitrobenzene | 126–175 | 43 | 710 | 533 | 65.0 | 60.5 | 48.5 |
| XXVIII | 6 g. chlorosulfonic acid, 6 g. m-dinitrobenzene | 134–176 | 49 | 711 | 517 | 80.0 | 72.4 | 57.9 |
| XXIX | 6 g. sulfur monochloride (S₂Cl₂) | 121–175 | 42 | 639 | 468 | 55.0 | 45.0 | 40.0 |
| XXX | 10 g. sulfur monochloride (S₂Cl₂), 10 g. nitrobenzene | 135–174 | 57 | 781 | 497 | 70.0 | 60.8 | 44.2 |
| XXXI | 12 g. phosphorus trichloride | 127–180 | 49 | 710 | 478 | 59.0 | 49.4 | 39.4 |
| XXXII | 37 g. phosphorus oxychloride | 120–178 | 38 | 916 | 517 | 77.0 | 69.6 | 42.8 |

Table II also summarizes Comparative Examples XXXI and XXXII wherein phosphorus-containing compounds were used as the chlorination catalyst in the absence of a nitro aromatic compound. It will be seen by a comparison of these two examples with preceding examples that this invention offers advantages over the use of catalytic amounts of only phosphorus-containing halides and oxyhalides as the chlorination catalyst. When the method of this invention is employed, yields of the desired alpha,alpha-dichloropropionic acid are as high or higher and the rates of chlorination are as great or greater than those obtained when catalytic amounts of only a phosphorus-containing halide is used as the chlorination catalyst. Lesser quantities of the chlorination catalyst are required when the method of this invention is employed.

Phosphorus-containing halides are very toxic and, because they have relatively high vapor pressures and relatively low boiling points, they are hazardous to use. This is particularly true under the conditions employed for carrying out these reactions. Because of their high vapor pressures and relatively low boiling points, these phosphorus-containing halides and oxyhalides, being those commonly employed heretofore for this type of reaction, are vaporized and lost from reaction mixtures maintained hydrogen, chlorine and bromine in the presence of about 0.3–15 weight percent based on the weight of organic acid of a sulfur-containing halogenation catalyst selected from the group consisting of sulfur and the halides, oxyhalides, oxides, oxygen acids, and halo-oxygen acids of the element sulfur, the improvement which comprises carrying out the reaction in the presence of about 0.3–15 weight percent based on the weight of organic acid of a nitro aromatic compound wherein the nitro aromatic compound contains a benzene ring system to which are attached one or more nitro groups.

2. The process of claim 1 wherein the nitro aromatic compound is p-nitrobenzoic acid.

3. The process of claim 1 wherein the sulfur-containing halogenation catalyst is fuming sulfuric acid.

4. The process of claim 1 wherein Y is hydrogen and X and the reacting halogen are chlorine.

5. The process of claim 6 wherein R is the methyl radical.

6. The process of claim 5 wherein the nitro aromatic compound is p-nitrobenzoic acid.

7. The process of claim 6 wherein the sulfur-containing halogenation catalyst is fuming sulfuric acid.

(References on following page)

References Cited

UNITED STATES PATENTS

| | | | |
|---|---|---|---|
| 2,043,670 | 6/1936 | Loder et al. | 260—539 |
| 2,809,992 | 10/1957 | Brust et al. | 260—539 |

FOREIGN PATENTS

| | | |
|---|---|---|
| 914,428 | 1/1963 | Great Britain. |

OTHER REFERENCES

Olah: Friedel-Crafts and Related Reactions, volume I, pp. 298–299 (1963).

LORRAINE A. WEINBERGER, *Primary Examiner.*

A. P. HALLUIN, *Assistant Examiner.*

U.S. Cl. X.R.

260—408